United States Patent [19]
Leopold

[11] Patent Number: 5,320,065
[45] Date of Patent: Jun. 14, 1994

[54] CAT PLAYHOUSE AND METHOD OF MAKING SAME

[75] Inventor: Arthur B. Leopold, Secaucus, N.J.

[73] Assignee: Tarel Seven Design, Inc., Paramus, N.J.

[21] Appl. No.: 912,155

[22] Filed: Jul. 10, 1992

[51] Int. Cl.⁵ .................................. A01K 1/00
[52] U.S. Cl. ........................... 119/19; 119/706; 220/429; 229/120.32
[58] Field of Search .......... 119/19, 29, 15, 17; 229/120.32, 120.34; 220/4.29

[56] References Cited

U.S. PATENT DOCUMENTS

| | | | |
|---|---|---|---|
| 2,218,360 | 10/1940 | Rokol | 229/120.32 |
| 4,264,031 | 4/1981 | Goebel | 229/125.17 |
| 4,347,807 | 9/1982 | Reich | 119/19 |
| 4,391,223 | 7/1983 | Holland et al. | 119/19 |
| 4,520,758 | 6/1985 | Pfriender | 119/19 |
| 4,850,306 | 7/1989 | Nitkin | 119/15 |
| 5,050,536 | 9/1991 | Baker | 119/19 |

*Primary Examiner*—John G. Weiss
*Attorney, Agent, or Firm*—Ohlandt, Greeley & Ruggiero

[57] ABSTRACT

The foldable, multiple level playhouse for cat has a collapsible housing with a plurality of wall panels that are movable relative to each other to a collapsed or folded position for storage. Each side panel has at least one floor slot. The playhouse includes at least one floor member that is adapted to be removably connected to the plurality of wall panels. The floor member has a plurality of perimeter tabs each adapted to be received in the slots of the wall panels to lock the floor into position in the housing. The floor member has a portion that is adapted to fold downward to the floor of the next adjacent level of the cat playhouse to form a ramp between the two levels and to provide support for the floor member.

18 Claims, 8 Drawing Sheets

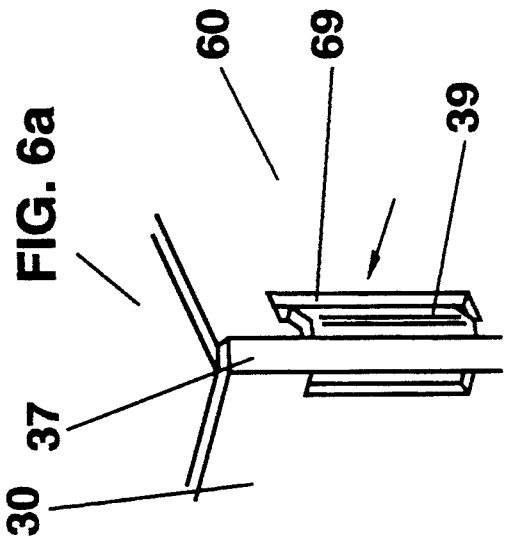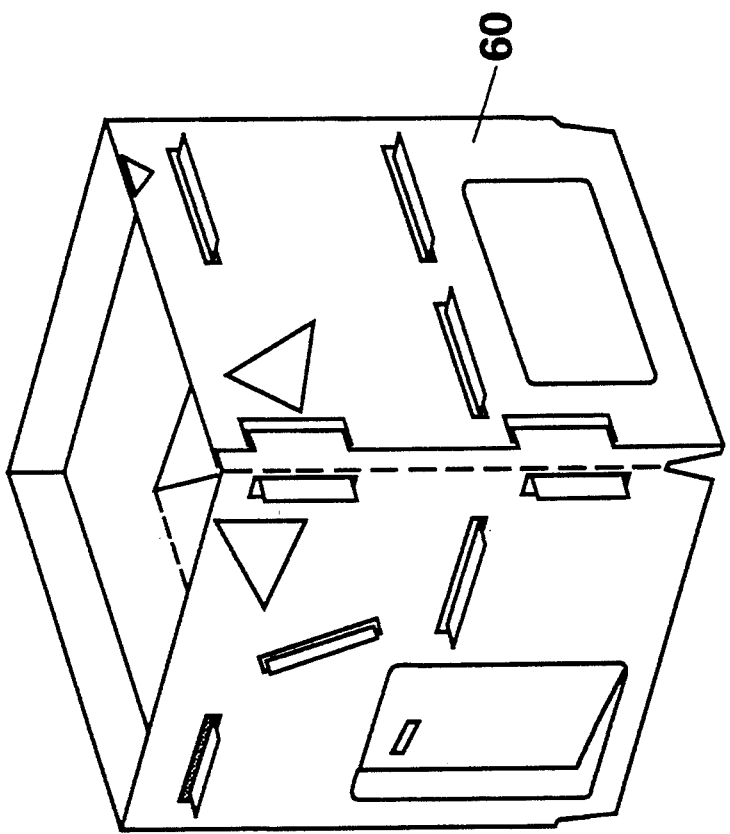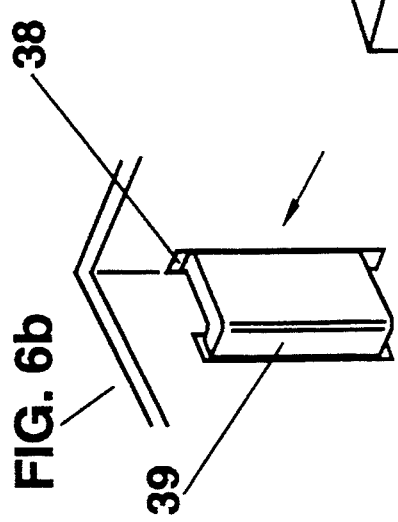

CAT PLAYHOUSE AND METHOD OF MAKING SAME

BACKGROUND OF THE INVENTION

1. Field of the Invention

The present invention relates generally to a cat playhouse and a method of making same. More particularly, the present invention relates to a multiple level cat playhouse that is easily collapsible and foldable for easy shipment and storage. When assembled, the cat playhouse has sufficient structural strength to withstand the weight of a cat. More particularly, the cat playhouse has several levels of play and permits interior movement of the cat from one level to another level. Further, the cat playhouse is relatively inexpensive to manufacture since it may use one type of structural material for the walls and floors and the walls and floors themselves provide the means for fastening themselves together. Still further, the material, such as, cardboard, is relatively inexpensive.

2. Description of the Prior Art

Animals, such as cats, enjoy exploring, hiding and resting in cozy places, such as, for example, boxes, shopping bags and the like. In a home, it is desired to have an item, such as a playhouse, to provide the cat with the opportunity to explore, hide and rest in a desired location in the home. When entertaining guests, it is desirable to fold and store the playhouse and thereby provide additional room to entertain guests.

The use of playhouses to entertain cats is known. Some earlier playhouses, such as, for example, the playhouse shown in U.S. Pat. No. 4,347,807 entitled Cat Condominium and Method of Making Same, which issued on Sept. 7, 1982 to Marvin Reich, is directed to a cat condominium that is foldable for shipment and, when assembled, has a plurality of compartments each with an exterior opening that relies on the natural curiosity of the cat to explore the various compartments. There is no provision from moving internally from one compartment to another.

Later cat playhouses, such as, for example, U.S. Pat. No. 5,050,536 entitled Playhouse For Cats, which issued on Sept. 24, 1991 to Reginald D. Baker, is directed to a multiple level, foldable cat playhouse that provides a plurality of beam members that extend through slots formed in the vertical panels or side walls of the playhouse and locking flap assemblies joined to the uppermost end of each vertical panel or side wall. The plurality of beam members protrude through the side walls and are exposed externally. To assembly this playhouse, each of the plurality of beam members needs to be positioned in opposed, slotted side walls. This playhouse has many more components than the present playhouse thereby increasing the assembly time, cost and complex of manufacturing the playhouse.

Thus, the prior art fails to provide a cat playhouse that permits internal movement, is easily foldable, inexpensive to manufacture and assembly, and provides a minimum number of components.

SUMMARY OF THE INVENTION

Against the foregoing background, it is a primary object of the present invention to provide a cat playhouse.

It is another object of the present invention to provide such a cat playhouse with multiple levels and means for permitting the cat to move internally from one level to another level.

It is still another object of the present invention to provide such a cat playhouse in which the means for permitting internal movement of the cat also serves to support for the levels of the playhouse.

It is yet another object of the present invention to provide such a cat playhouse having a plurality of side or wall panels that are interconnected along fold lines and at least one floor panel that is adapted to be removably connected to the one or more wall panels.

It is a further object of the present invention to provide such a cat playhouse in which the means for connecting together the floor to the wall panels are integral components of the floor and wall panels.

It is a still further object of the present invention to provide such a cat playhouse in which two such cat playhouses can be stacked one upon the other to provide a structure of four or more levels of play for the cat.

To the accomplishments of the foregoing objects and advantages, the present invention, in brief summary, comprises a foldable, multiple level cat playhouse including a collapsible housing having a plurality of wall panels that are movable relative to each other to a collapsed or folded position for storage, with each of the plurality of wall panels having a slot. The cat playhouse has at least one floor member adapted to be removably connected to the plurality of wall panels. The floor member has a plurality of protruding tabs each adapted to be received in the slot of a wall panel to secure the floor member in place in the housing. The floor member has a portion that is adapted to fold downward to the the next adjacent floor or level of the cat playhouse to form a ramp between the two levels and to support the floor member.

BRIEF DESCRIPTION OF THE DRAWINGS

The foregoing and still other objects and advantages of the present invention will be more apparent from the following detailed explanation of the preferred embodiments of the invention in connection with the accompanying drawings wherein:

FIGS. 6, 6A and 6B are exploded views of the corner locking mechanism of the cat playhouse of FIG. 1;

BRIEF DESCRIPTION OF THE PREFERRED EMBODIMENTS

Figure 1:
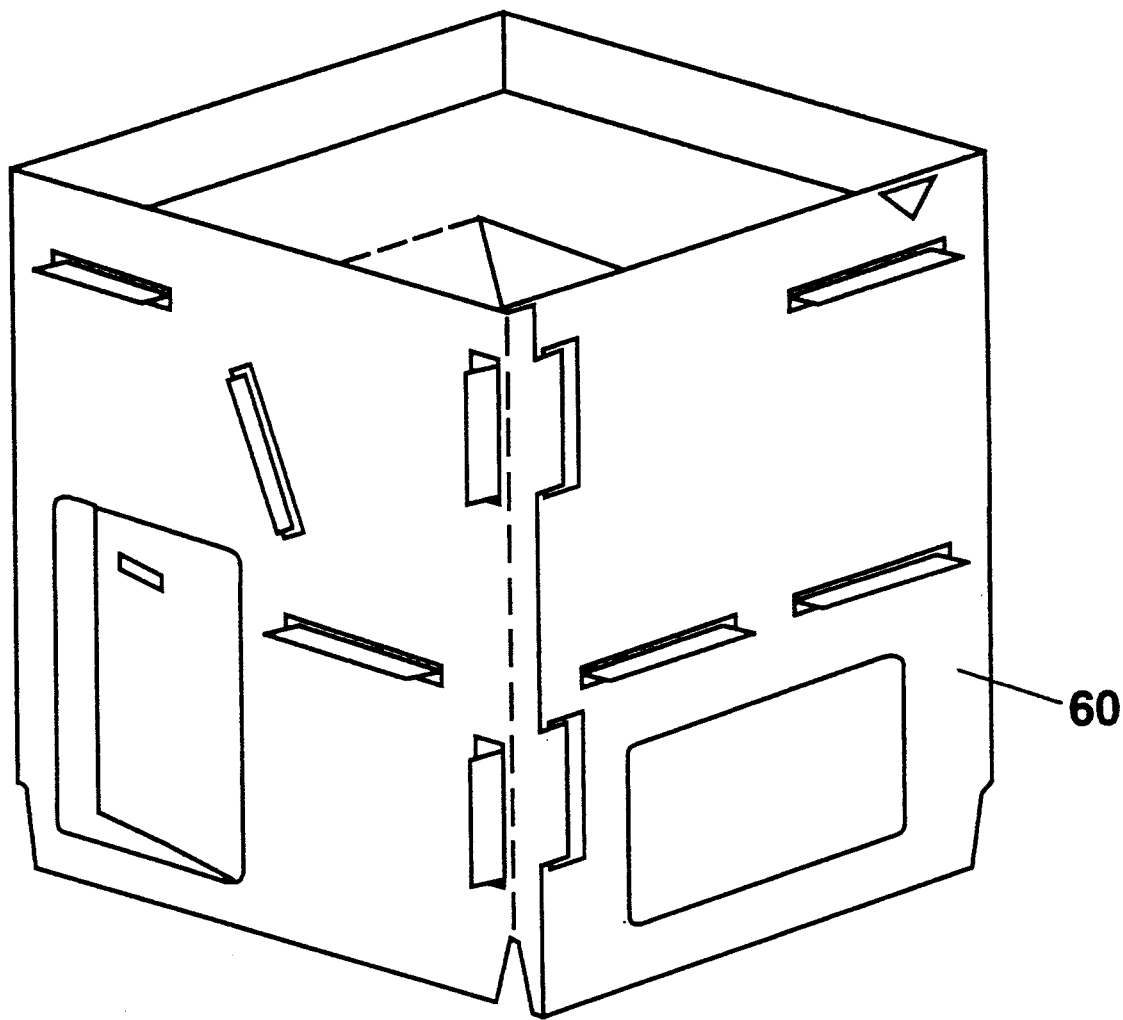
FIG. 1 is a perspective view of the cat playhouse of the present invention.
Figure 2:
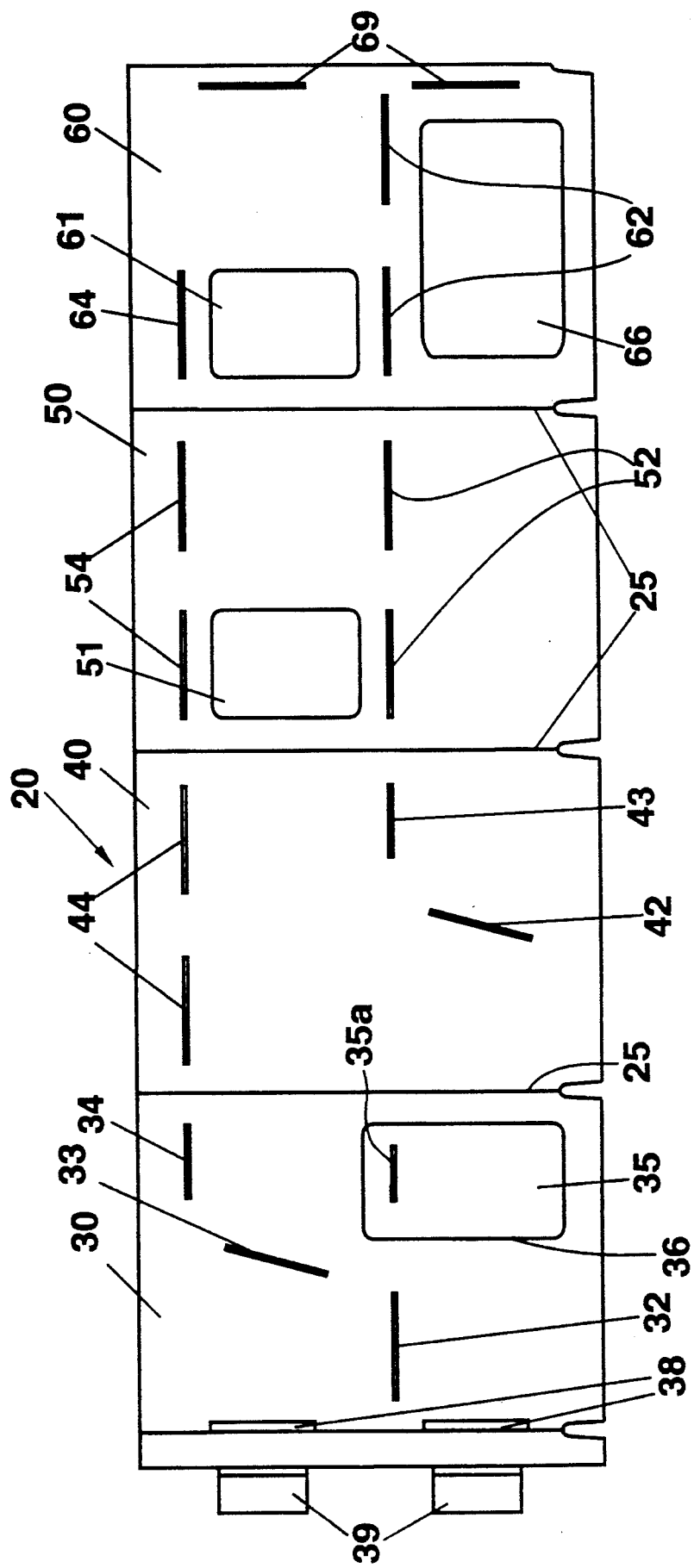
FIG. 2 is a plan view of the housing of the cat playhouse of FIG. 1.

Referring to the drawings and in particular FIGS. 1 and 2, there is provided a playhouse for animals, such as, cats, generally represented by reference numeral 10. The playhouse 10 has a unitary body or housing 20 that includes four side walls or panels 30, 40, 50 and 60 that are connected together and are adapted to fold along fold lines 25. The playhouse 20, in addition, includes a first or lower floor 70 shown in FIG. 3 and a second or upper floor 80 shown in FIG. 4. The floors 70 and 80 are adapted to be removably inserted into the wall panels of the housing 20.

The housing 20 and the floors 70 and 80 can be made of any rigid type material. The material is, preferably, cardboard. However, it is believed that the material may be compressed wood or plastic. These materials are not as preferred since they are more costly and heavier.

Figure 8:
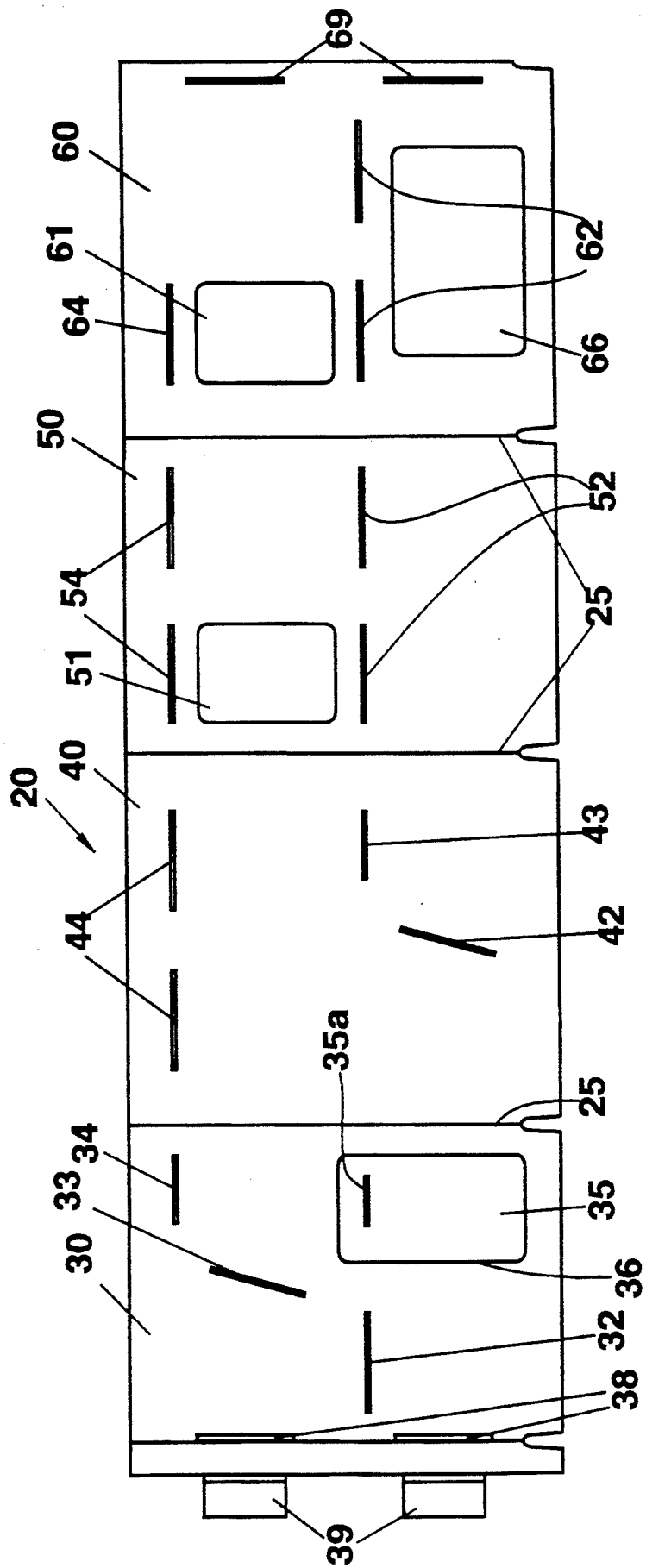
FIG. 8 is a plan view of an alternative embodiment of the cat playhouse of FIG. 1.

In the preferred embodiment shown in FIGS. 1 through 6, panels 30 and 50 oppose each other when the playhouse 10 is in its assembled condition. Likewise, panels 40 and 60 also oppose each other when the playhouse 10 is in its assembled condition. In the preferred embodiment, all of the panels 30, 40, 50 and 60 are equally sized. In an alternative embodiment, shown in FIG. 8, the opposed panels, for example panels 30 and 50, are of the same size but different in size than the other pair of opposed panels 40 and 60. However, each panel can be of different sizes with respect to the other panels.

It is also anticipated that more than four panels can be used for the housing 20 of the playhouse 10. While an even number of panels are shown, an odd number of panels can be used.

Figure 3:
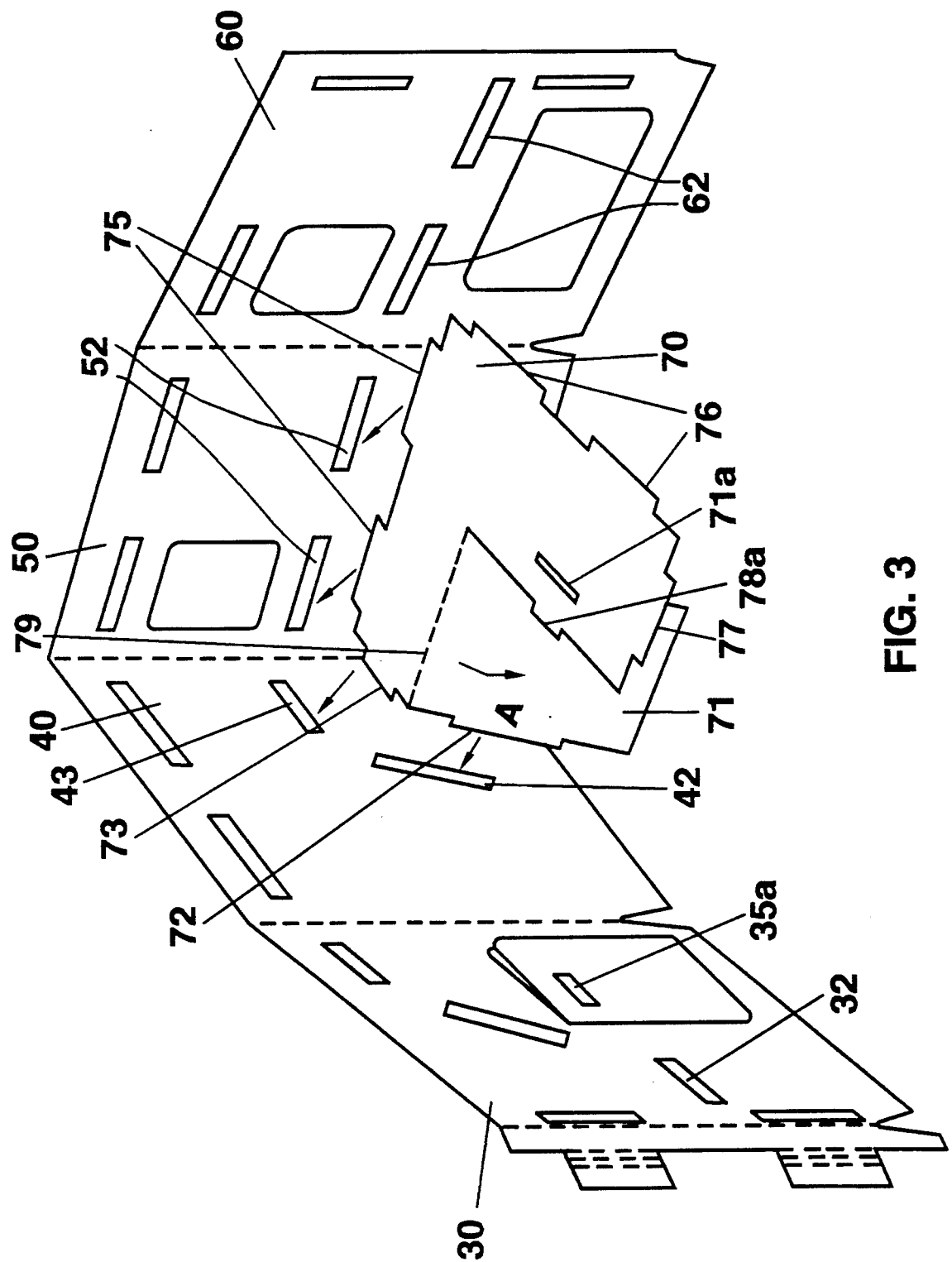
FIG. 3 is a perspective view of a portion of the cat playhouse of FIG. 1 illustrating the insertion of the lower floor.
Figure 4:
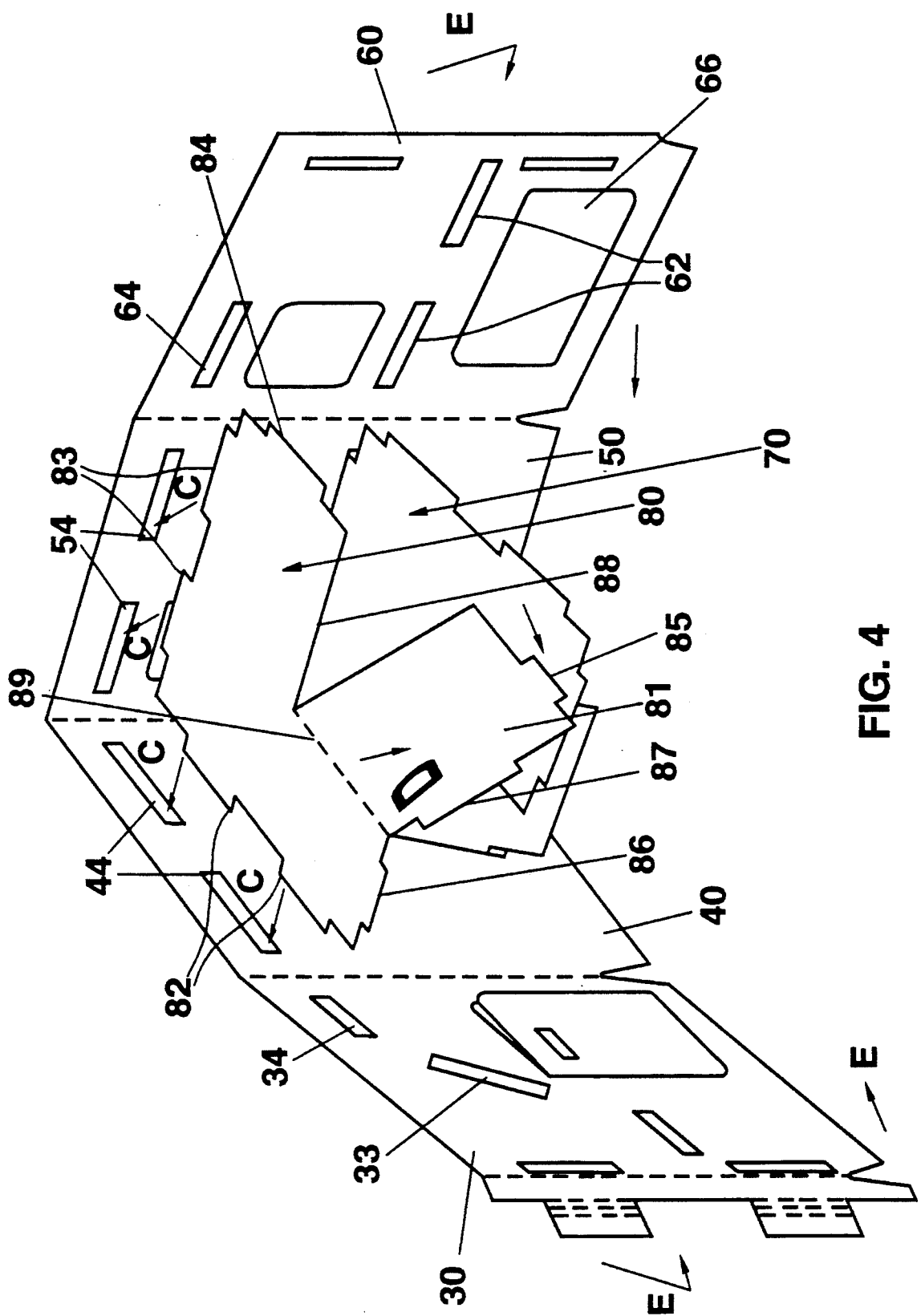
FIG. 4 is a perspective view of a portion of the cat playhouse of FIG. 1 illustrating the insertion of the upper floor.

Referring to FIG. 2, the first wall panel 30 has a pair of vertical slots 38 and a pair of tabs 39. The first panel 30, preferably, has at least three floor slots 32, 33 and 34 and, also preferably, includes a door 35 that is adapted to fold about fold line 36 in order to open and close. Referring to FIG. 3, the lowermost floor slot 32 is adapted to hold the first floor 70. Referring to FIG. 4, the uppermost floor slot 34 is adapted to hold the second floor 80 and the intermediate floor slot 33 is adapted to anchor into position the ramp 81 of the second floor 80 to thereby anchor the ramp into position. In a preferred embodiment, the door 35 has a slot 35a shown in FIGS. 2 and 3 that mates with a tab of the first floor 70 in order to maintain the door in an opened position.

The second panel 40 has a pair of lower floor slots 42, 43 that are adapted to secure the first floor 70 to the second panel. In the preferred embodiment shown in FIG. 3, slot 42 secures the ramp 71 of the first floor 70 in place, while floor slot 43 secures the base or horizontally flat portion of the first floor in place. As shown in FIGS. 2 and 4, the second panel 40 also includes a pair of upper floor slots 44 that are adapted to removably secure the second floor 80 to the second panel as shown in FIG. 4. The pair of upper floor slots 44 are, preferably, horizontally aligned with each other and substantially parallel to the upper edge of the panel in order to provide a horizontally level, second floor.

All of the slots in all of the panels are, preferably, elongated slots. In the most preferred embodiment, the slots have a rectangular shape. Except for the ramp anchoring slots 33 and 42, all floor slots are, preferably, horizontally positioned in order to provide that the first and second floors are basically level with the ground and, thereby, basically perpendicular to the panels of the housing 20.

Referring to FIGS. 2 through 4, the third panel 50 includes a pair of lower floor slots 52 and a pair of upper floor slots 54 to secure the first floor 70 and the second floor 80, respectively, to the third panel. The pair of lower and upper floor slots 52, 54, respectively, are, preferably, horizontally aligned with each other and substantially parallel to the upper edge of the panel in order to provide a horizontally level floors. The fourth panel 60 includes a pair of lower floor slots 62 to the secure the first floor 70 to the third panel, but only a single upper floor slot 64 to secure the second floor 80 to the third panel. The lack of a second upper slot is to provide for the opening to permit the cat to move back and forth from the first floor 70 to the second floor 80.

Referring again to FIG. 2, the third panel 50, preferably, has a window 51 that is a cut-out to permit the cat to view outside of the housing 20 when resting on the second floor 80. Likewise, the fourth panel 60, preferably, has a window or cut-out 61 for viewing when the cat is one the second floor 80. The fourth panel 60 has a pair of vertical slots 69. In a most preferred embodiment, the fourth wall panel 60 also includes a second elongated window or cutout 66 so that the cat can view the outside when on the ground floor, i.e. below the first floor 70.

The first floor 70, as shown in FIG. 3, and the second floor, as shown in FIG. 4, have basically a square shape. The first floor 70 is cut along edge 78 and has a fold line 79 in order to permit ramp 71 to move about the fold line. Likewise, the second floor 80 is cut along edge 88 and has a fold line 89 in order to permit ramp 81 to move about the fold line. To keep the door 35 of the first panel 30 in the open position, there is provided a tab 78a on the first floor 70 that mates with slot 35a of the door to retain the door in its open condition.

Each floor has a plurality of protruding perimeter tabs. In the preferred embodiment shown in FIG. 3, the first floor 70 has tabs 72, 73 adapted to be received in floor slots 42, 43, respectively, of the second wall panel 40, a pair of tabs 75 adapted to be received in the pair of floor slots 52 of the third floor panel 50, a pair of tabs 76 adapted to be received in the pair of floor slots 62 of the fourth wall panel 60, and a tab 77 adapted to be received in floor slot 32 of the first wall panel 30.

In the preferred embodiment shown in FIG. 4, the second floor 80 has a pair of tabs 82 adapted to be received in the pair of floor slots 44 of the second wall panel 40, a pair of tabs 83 adapted to be received in the pair of floor slots 54 of the third floor panel 50, a tab 84 adapted to be received in floor slot 64 of the fourth wall panel 60, and a tab 86 adapted to be received in floor slot 34 of the first wall panel 30 and an angled tab 87 adapted to be received in ramp anchoring slot 33 of the first floor panel 30. The ramp 81 of the second floor 80 also has a tab 85 that is adapted to be received in a slot 71a shown more clearly in FIG. 3 in the first floor 70.

As shown in FIG. 4, the angular positioning of slot 33 in the first panel 30 and slot 42 of the second panel 40 are to secure the ramps of the second floor 80 and the first floor 70 in place such that the cat can move by ramp 71 from the ground floor to the first floor or level 70 and then walk about the first floor and up ramp 81 to the second floor 80 as shown in FIG. 4.

As shown in FIG. 1, the tabs of the first and the second floors protrude out of the walls panels of the housing 20 to secure the floors in place.

Figure 5:
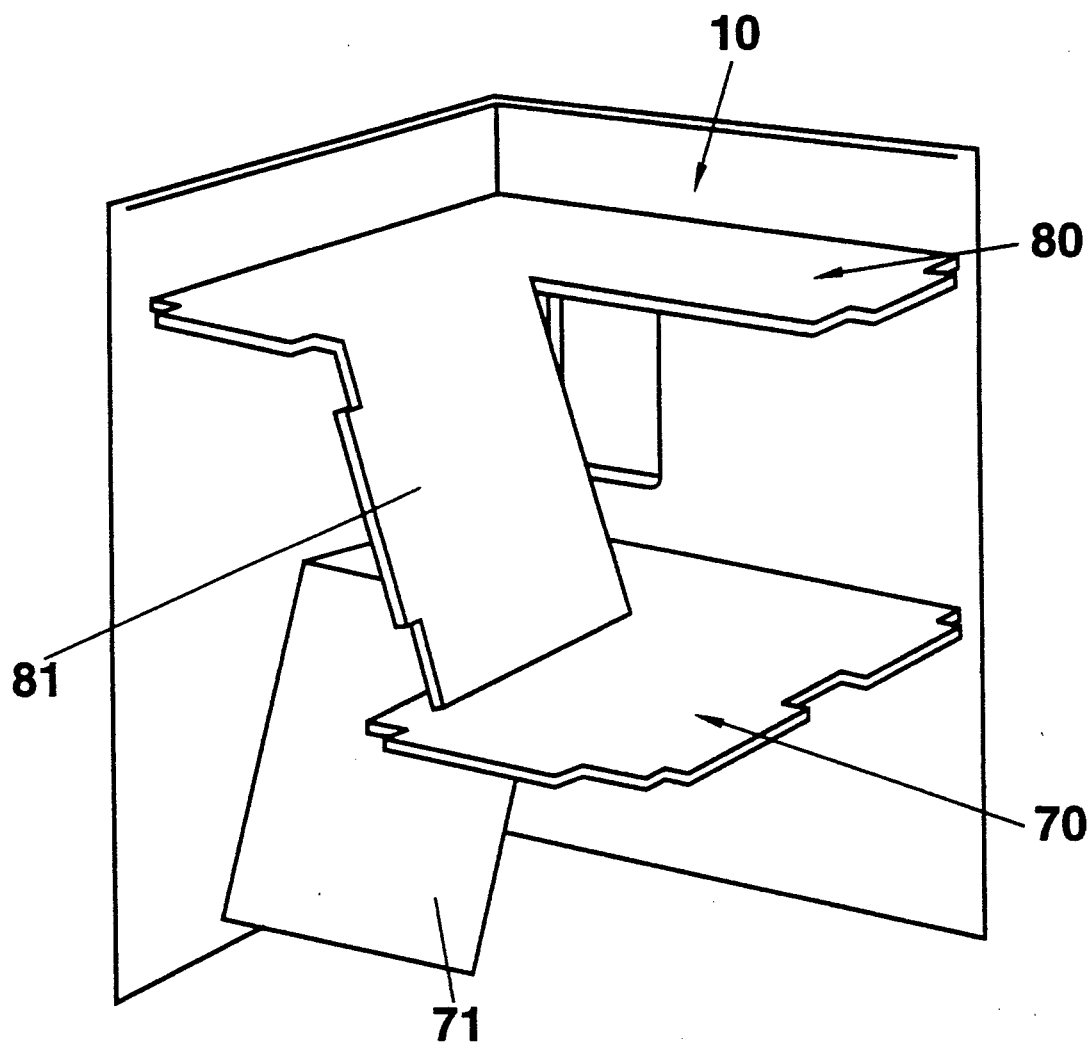
FIG. 5 is a sectional view in perspective of the cat playhouse of FIG. 1.

Referring to FIG. 5, the cat playhouse 10 in its assembled state provides two levels of play or travel for the cat. From the ground, the cat climbs on ramp 71 to a hideaway level in which the cat is enclosed by the playhouse 10. When the cat climbs up ramp 81 it reaches the top or sun deck level 80 so that it can rest comfortably yet view the surroundings outside of the playhouse.

The cat playhouse is, presumably, in its folded condition when not in use. For assembly, the housing 20 of the playhouse should be unfolded as shown in FIG. 2. The ramp 71 of the first floor 70 should be folded downward as shown by arrow A in FIG. 3 and then tabs 72, 73 and the pair of tabs 75 should be tightly inserted into floor slots 42, 43 and 52, respectively as shown by arrows B. Referring to FIG. 4, the second floor 80 should be inserted into the second and third wall panels 40 and 50 by inserting the pairs of tabs 82 and 83 into floor slots 44 and 54, respectively as shown by arrows C. The ramp 81 of the second floor 80 is then folded downward as shown by arrow D and tab 85 of the second floor is inserted into slot 71a of the first floor to secure tightly the ramp 81 between the floors. The ramp 81 also acts as a structural support for the second floor 80. The remaining two wall panels 30 and 60 are folded into position as shown by arrows E and the remaining tabs of the first and second floors are tightly inserted into the remaining floor slots.

Referring to FIG. 6, the free end of the fourth panel 60 is connected to the free end of the first panel 30 by the flap 37 and tabs 39 in the first panel and the vertical slots 38 and 69 in the first wall panel and the fourth wall panel, respectively. For example, the free edge of the fourth panel 60 mates with the flapped edge 37 of the first panel 30. The fourth panel 60 has a pair of vertically, elongated apertures or slots 69 that are adapted to receive tabs 39 in order to lock the housing 20 in its closed or assembled condition. To secure the first panel 30 and the fourth panel 60 together and thereby close the housing 20, the flapped edge 37 is folded around the corner of the fourth panel and tabs 39 are inserted into slots 69 as shown in FIG. 6a. The tabs 39 are continued and are folded from the inside of the first panel 30 into and through slots 38 as shown in FIG. 6b.

The locking mechanisms to secure the floors to the housing and to lock the foldable housing in its assembled state as shown in FIG. 1 are, preferably, integral portions of the housing and the floors themselves.

In its assembled state, the two story playhouse measures about 27 inches high and about 20 inches square. In this sized playhouse, two cats can comfortably move about through the playhouse. In this assembled state, the housing 20 with the floors 70 and 80 therein form two enclosed compartments and a balcony, namely the second floor 80.

To disassemble the playhouse 10, simply undue the flapped end 37 and unfold the wall panels so that the tabs on both floors separate from the floor slots. Accordingly, the present playhouse 10 can be readily assembled and disassembled.

Figure 7:
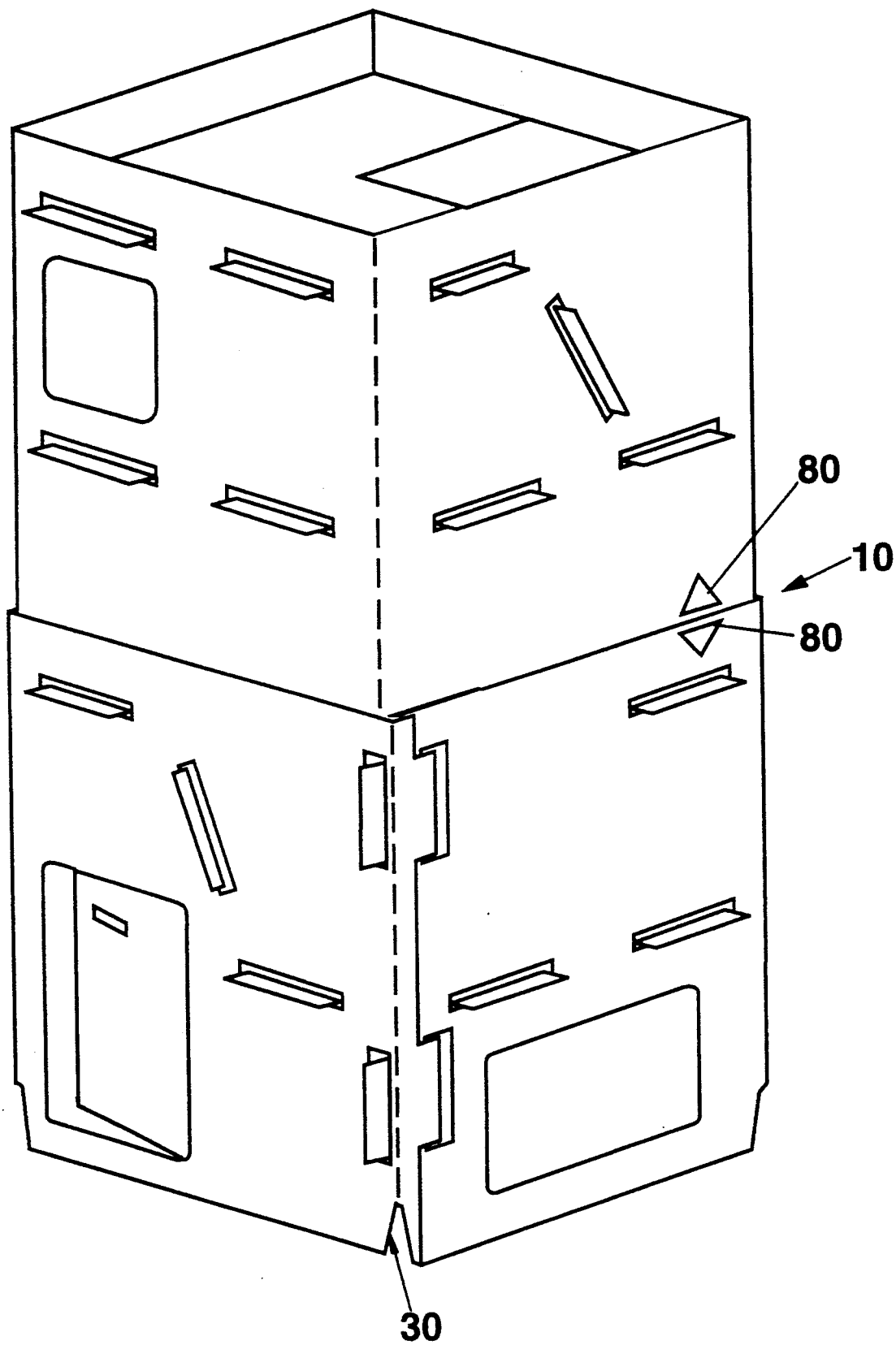
FIG. 7 is a perspective view of a pair of the cat playhouses of FIG. 1 stacked one on the other.

As shown in FIG. 7, the playhouse 10 can be enlarged by simply stacking two playhouses one atop the other so that a four story structure is provided. To do so, there has been provided cutouts 30 the bottom of each fold line or corner of the housing 20 in order to permit the inward biasing of the panels. This inward biasing causes the bottom of the upper playhouse to fit within the upper edge portion of the housing of the lower playhouse so that the upper playhouse rests on the second floor of the lower playhouse. To provide this tight stacking of two playhouses, the bottom corners of the upper playhouse should be pressed inward one at a time and, then, the upper playhouse should be slide into the lower playhouse.

By this precise stacking, the ramps of the lower floor of the upper playhouse contacts the upper floor of the lower playhouse so that a continuous ramp between the floors is provided in order for the cat to move from floor to floor. There is also provided indicators 80 on the fourth and the second wall panels of the playhouses for proper alignment.

Having thus described the invention with particular references to the preferred forms thereof, it will be obvious that various changes and modifications may be made therein without departing from the spirit and scope of the invention as defined by the appended claims.

Wherefore, I claim:

1. A foldable multiple level playhouse for a cat to be positioned on a ground surface including a substrate, floor or table, comprising:

a collapsible housing having a plurality of wall panels that are connected together along fold lines to form a continuous sheet of material and are movable relative to each other in order to collapse upon each other in an accordion manner for storage, each of the plurality of wall panels having two rows of horizontally elongated floor slots, two of the plurality of wall panels having a single angled elongated slot but on a different horizontal plane with respect to the other;

means for connecting together the ends of the continuous sheet of material to form a free standing structure;

a first floor and a second floor each being adapted to be removably positioned in the housing, the first floor being adapted to be positioned above and separated from the second floor, the first and second floors being adapted to be removably connected to the plurality of wall panels, the first and the second floor each having a plurality of perimeter tabs that are adapted to be received in the floor slots to secure the floors in place in the housing, the first floor having a portion thereof that is adapted to fold downward to the second floor to form a ramp between the first and second floors and to support the first floor, the second floor also having a portion thereof that is adapted to fold downward to form a ramp between the second floor and ground level and to support the second floor, wherein one of the two wall panels has a single angled elongated slot that secures in place the ramp of the first floor when the first floor ramp is in operative position, and wherein the other of the two wall panels has a single angled elongated slot that secures in place the ramp of the second floor when the second floor ramp is in operative position; and means for securing the ramp of the first floor in the second floor.

2. The playhouse according to claim 1, wherein all of the wall panels have the same size and shape.

3. The playhouse according to claim 1, wherein the plurality of wall panels are an even number of wall panels.

4. The playhouse according to claim 2, wherein opposed wall panels have the same size and shape but differ in size and shape from other opposed wall panels.

5. The playhouse according to claim 1, wherein the connecting means is a plurality of tabs and slots on the free ends of the continuous sheet of material.

6. The playhouse according to claim 5, wherein the tabs and slots are integrally formed on the continuous sheet of material.

7. The playhouse according to claim 1, wherein the first floor has a flat portion with a separation line through a partial portion thereof in order to form a ramp portion that folds downward to connect the first floor and the second floor of the playhouse.

8. The playhouse according to claim 1, wherein the housing and the first floor are made of a material selected from the group consisting of cardboard, compressed wood and plastic.

9. The playhouse according to claim 8, wherein the material is cardboard.

10. The playhouse according to claim 1, further comprising indicator means to assist in alignment when two playhouses are stacked one on top of the other.

11. The playhouse according to claim 1, wherein the each of the two rows of floor slots are in horizontal alignment in the four wall panels.

12. The playhouse according to claim 1, wherein the four wall panels has a first wall panel that includes a single floor slot in each of the two rows of floor slots and has one of the two angled slots that is adapted to receive a tab from the second floor, and wherein the first wall panel includes a door that is adapted to open and close to permit the cat to enter into the playhouse.

13. The playhouse according to claim 12, wherein the four wall panels includes a second wall panel that includes a single floor slot in the lower of the two rows of floor slots, and has other of the two angular slots that is adapted to receive a tab from the first floor.

14. The playhouse according to claim 13, wherein the four wall panels includes a third wall panel that includes a pair of floor slots in each of the two rows of floor slots.

15. The playhouse according to claim 14, wherein the four wall panels includes a fourth wall panel that includes a single floor slot in the upper of the two rows of floor slots and a pair of floor slots in the lower of the two rows of floor slots.

16. The playhouse according to claim 15, wherein each floor slot has a rectangular shape.

17. A method for assemblying a foldable cat playhouse that comprises a collapsible housing having a four wall panels that are connected together along fold lines to form a continuous sheet of material, each of the four wall panels having two rows of horizontally floor slots, two of the four wall panels having a single angled elongated slot but on a different horizontal plane with respect to the other, one of the free ends of the continuous sheet of material being a flapped structure and having a vertical row of slots and tabs and the other of the free ends having a vertical row of slots, and a pair of floors each having a plurality of perimeter tabs and each having a portion thereof that is adapted to fold downward to form a ramp, the method comprising:
   unfolding the four wall panels of the housing;
   folding downward the ramp of the lower one of the pair of floors;
   inserting tabs of the lower floor into two of the four wall panels;
   inserting the upper one of the pair of floors into the same two of the four wall panels;
   folding downward the ramp of the upper floor;
   inserting a tab from the ramp of the upper floor into the lower floor to secure tightly the ramp between the floors;
   folding the remaining two of the four wall panels so that the free ends of the housing meet and the remaining tabs of the pair of floors are tightly inserted into the remaining floor slots; and
   securing together the free ends of the housing.

18. The method according to claim 17, wherein the securing step comprises:
   folding the flapped free end around the corner of the other free end; and
   inserting the tabs of the flapped free end into slots of the other free end and into and through the slots of the flapped free end.

* * * * *